US008825721B2

(12) United States Patent
Hunt et al.

(10) Patent No.: US 8,825,721 B2
(45) Date of Patent: *Sep. 2, 2014

(54) TIME-BASED OBJECT AGING FOR GENERATIONAL GARBAGE COLLECTORS

(75) Inventors: Charlie Hunt, Libertyville, IL (US); Antonios Printezis, Burlington, MA (US); Staffan Friberg, Hagersten (SE)

(73) Assignee: Oracle International Corporation, Redwood City, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 13/251,974

(22) Filed: Oct. 3, 2011

(65) Prior Publication Data

US 2013/0086132 A1    Apr. 4, 2013

(51) Int. Cl.
*G06F 17/30* (2006.01)
*G06F 12/02* (2006.01)

(52) U.S. Cl.
CPC .................. *G06F 12/0276* (2013.01)
USPC ........................................................ 707/819

(58) Field of Classification Search
CPC ..................... G06F 12/0276; G06F 12/0253
USPC ........................................................ 707/819
See application file for complete search history.

(56) References Cited

U.S. PATENT DOCUMENTS

| | | | |
|---|---|---|---|
| 5,241,673 A | | 8/1993 | Schelvis |
| 5,604,902 A | * | 2/1997 | Burkes et al. ........................ 1/1 |
| 5,765,174 A | * | 6/1998 | Bishop ................................. 1/1 |
| 5,857,210 A | * | 1/1999 | Tremblay et al. ..................... 1/1 |
| 5,873,105 A | * | 2/1999 | Tremblay et al. ..................... 1/1 |
| 5,933,840 A | | 8/1999 | Menon et al. |
| 5,960,087 A | | 9/1999 | Tribble et al. |
| 6,047,125 A | * | 4/2000 | Agesen et al. ................ 717/148 |
| 6,065,020 A | * | 5/2000 | Dussud ................................ 1/1 |
| 6,300,962 B1 | * | 10/2001 | Wishoff et al. ................ 345/543 |
| 6,314,435 B1 | * | 11/2001 | Wollrath et al. ..................... 1/1 |
| 6,442,661 B1 | * | 8/2002 | Dreszer .......................... 711/170 |
| 6,598,141 B1 | * | 7/2003 | Dussud et al. ................ 711/170 |
| 6,618,738 B2 | * | 9/2003 | Ozawa et al. ......................... 1/1 |
| 6,658,652 B1 | * | 12/2003 | Alexander et al. ............ 717/128 |
| 6,748,503 B1 | * | 6/2004 | Morrison ...................... 711/159 |
| 6,763,440 B1 | * | 7/2004 | Traversat et al. ............. 711/159 |
| 6,799,191 B2 | * | 9/2004 | Agesen et al. ........................ 1/1 |
| 6,839,725 B2 | * | 1/2005 | Agesen et al. ........................ 1/1 |
| 6,865,657 B1 | * | 3/2005 | Traversat et al. ............. 711/170 |
| 7,051,026 B2 | * | 5/2006 | Berry et al. ........................... 1/1 |

(Continued)

OTHER PUBLICATIONS

Andrew W. Appel, "Simple Generational Garbage Collection and Fast Allocation," Software Practice and Experience, 19(2), pp. 171-183, Feb. 1989.*

(Continued)

*Primary Examiner* — Sheree Brown
(74) *Attorney, Agent, or Firm* — Polsinelli PC

(57) ABSTRACT

System and Methods for time based object aging for generational garbage collectors are provided. Time data is received from a user identifying the amount of time an object should survive in a generation defined in a heap. Generational garbage collection is performed, and objects are promoted from one generation to the next oldest generation based on the time data received.

15 Claims, 7 Drawing Sheets

(56) References Cited

U.S. PATENT DOCUMENTS

| | | | |
|---|---|---|---|
| 7,634,510 B2 * | 12/2009 | Marwah | 1/1 |
| 7,707,232 B2 * | 4/2010 | Dussud et al. | 707/819 |
| 7,853,627 B2 | 12/2010 | Printezis et al. | |
| 7,962,707 B2 | 6/2011 | Kaakani et al. | |
| 8,356,061 B2 * | 1/2013 | Vengerov | 707/813 |
| 2001/0044856 A1 * | 11/2001 | Agesen et al. | 709/315 |
| 2002/0165870 A1 * | 11/2002 | Chakraborty et al. | 707/206 |
| 2003/0055807 A1 | 3/2003 | Lomet | |
| 2003/0191783 A1 * | 10/2003 | Wolczko et al. | 707/206 |
| 2004/0088338 A1 * | 5/2004 | Garthwaite | 707/206 |
| 2006/0095427 A1 * | 5/2006 | Dickenson | 707/6 |
| 2006/0167961 A1 * | 7/2006 | Fox | 707/206 |
| 2006/0259528 A1 * | 11/2006 | Dussud et al. | 707/206 |
| 2007/0011415 A1 | 1/2007 | Kaakani et al. | |
| 2007/0162526 A1 | 7/2007 | Printezis et al. | |
| 2007/0180002 A1 | 8/2007 | Printezis et al. | |
| 2008/0235305 A1 | 9/2008 | Printezis et al. | |
| 2009/0204654 A1 | 8/2009 | Delsart et al. | |
| 2009/0319255 A1 * | 12/2009 | Vengerov | 703/22 |
| 2012/0254266 A1 | 10/2012 | Printezis et al. | |
| 2012/0254267 A1 | 10/2012 | Printezis et al. | |
| 2013/0086131 A1 | 4/2013 | Hunt et al. | |

OTHER PUBLICATIONS

David A. Barrett and Benjamin G. Zorn, "Garbage Collection using a Dynamic Threatening Boundary," LaJolla, CA, ACM SIGLAN Notices, vol. 30, pp. 301-311. Jun. 1995, ACM Press, Proc. SIGPLAN 95 Conf. on CCD.*

Paul R. Wilson, "Uniprocessor Garbage Collection Techniques," 1992 Int'l. Workshop on Memory Management Proc., Springer-Verlag, pp. 1-42.*

Richard Jones and Rafael Lins, "Garbage Collection-Algorithms for Automatic Dynamic Memory Management," John Wiley & Sons Ltd., 1996, pp. 1-41 and 143-181.*

U.S. Appl. No. 13/251,922, filed Oct. 3, 2011, Charlie Hunt et al.

Non-Final Office Action regarding U.S. Appl. No. 13/251,922, Jul. 19, 2012.

Response to Non-Final Office Action regarding U.S. Appl. No. 13/251,922, Nov. 19, 2012.

Final Office Action regarding U.S. Appl. No. 13/251,922, Jan. 31, 2012.

Response to Final Office Action regarding U.S. Appl. No. 13/251,922, Apr. 30, 2013.

Notice of Allowance regarding U.S. Appl. 13/251,922, May 30, 2013.

* cited by examiner

TIME-BASED OBJECT AGING FOR GENERATIONAL GARBAGE COLLECTORS

FIELD OF THE INVENTION

Aspects of the present disclosure relate to garbage collection and memory management, and more specifically to time-based object aging for generational garbage collectors.

BACKGROUND

In a Java Virtual Machine™ and other similar run-time environments, managing available memory is important to maintain performance and reliability. Typically, memory is allocated for an executing program from a pool of memory called a heap. When the executing program creates a new object, available memory in the heap is allocated for the object. Since the amount of memory available in the heap is limited, objects that are no longer used by the program need to be reclaimed, freeing up memory space.

Garbage collection is a form of memory management commonly used to gather up and recover unused and/or dead memory space in a heap. During execution of a program, a garbage collector attempts to identify memory allocated to objects that are unreachable or no longer in use by the executing program. A garbage collector deallocates any memory allocated to objects that are no longer reachable, freeing the memory space for future use.

SUMMARY

One aspect of the present disclosure involves a method for performing time-based object aging generational garbage collection. The method includes receiving at a processor, a time tenuring threshold specifying the amount of time a plurality of objects survive in a heap defined in a memory. The method also includes receiving time data indicating the occurrence of a plurality of garbage collections. The method includes calculating an object tenure age threshold based on the time data and the time tenuring threshold, where the object tenure age threshold specifies whether a particular object of a plurality of objects is promoted. The method also includes promoting at least one object of the plurality of objects when an object age corresponding to the at least one object meets an object tenure age threshold.

According to another aspect, a system is provided for performing time-based object aging generational garbage collection. The system includes at least one processor. The system also includes a memory. The system includes a time-based object aging generational garbage collection application comprising modules executable by the processor. The system modules include a receiving module to receive a time tenuring threshold specifying the amount of time a plurality of objects survive in a heap defined in a memory and receive time data indicating the occurrence of a plurality of garbage collections. The system modules includes an age calculation module to calculate an object tenure age threshold based on the time data and the time tenuring threshold specifying whether a particular object of a plurality of objects is promoted. The system modules also include an object promotion module to promote at least one object of the plurality of objects when an object age corresponding to the at least one object meets an object tenure age threshold.

According to yet another aspect, a computer-readable medium encoded with time-based object aging generational garbage collection application comprising modules executable by a processor is provided. The modules include a receiving module to receive a time tenuring threshold specifying the amount of time a plurality of objects survive in a memory and receive time data indicating the occurrence of a plurality of garbage collections. The modules include an age calculation module to calculate an object tenure age threshold based on the time data and the time tenuring threshold specifying whether a particular object of a plurality of objects is promoted. The modules include an object promotion module to promote at least one object of the plurality of objects when an object age corresponding to the at least one object meets an object tenure age threshold.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood and its numerous features made apparent to those skilled in the art by referencing the accompanying drawings.

DETAILED DESCRIPTION

The present disclosure describes systems and methods for time-based object aging for generational garbage collection. In various implementations, a heap space is divided into regions or sections called generations. Objects from one generation are copied and/or promoted to another, older generation, based on time data that indicates how long a given object should survive in a given generation. The time data may be obtained from a user, a programmer, or others, heuristically, statistically, embedded within the object itself (e.g., code specifying the time data or providing factors indicative of the time data) or otherwise provided.

Generational garbage collection is a type of garbage collection based on the observation that most objects will die (i.e. become no longer used by a program), or become unreachable shortly after being allocated in a heap space defined in a memory (i.e., most objects die young). Those objects that do not die young will likely continue to be live and reachable for an extended amount of time. To optimize garbage collection in light of such observations, generational garbage collection methods partition objects allocated in the heap into generations, such as a young generation and an old generation. The generations hold objects of different ages, where the object age is typically measured by the number of garbage collections the object has survived. Garbage collection is performed frequently on the young generation heap space. In contrast, garbage collection is performed on the old generation heap space less frequently, since it is assumed that most of the garbage is in the young generation.

To optimize and in some cases maximize generational garbage collection efficiencies, existing techniques for tuning generational garbage collection involve offering program developers the ability to modify parameters associated with a given garbage collector such as the size of a generation, tenuring thresholds, etc. However, in many instances, program developers may have a time-based understanding as to how long objects may be allocated or used by an executing program. Thus, garbage collection performance and efficiency may be improved by a generational garbage collection scheme that ages and promotes objects based on temporal information and/or time data.

In one aspect, an elapsed time between when an object was initially allocated in the heap and the time when a given garbage collection process begins may be determined. Subsequently, the elapsed time may be used with the time data to determine whether an object should be promoted from one generation to another generation.

According to another aspect, a circular buffer may be used in conjunction with the elapsed time to calculate a tenure age threshold. The tenure age may be compared to an object age to determine whether an object should be promoted from one generation to another generation. Optionally, an increment flag may be used to increment the object age.

Figure 1:
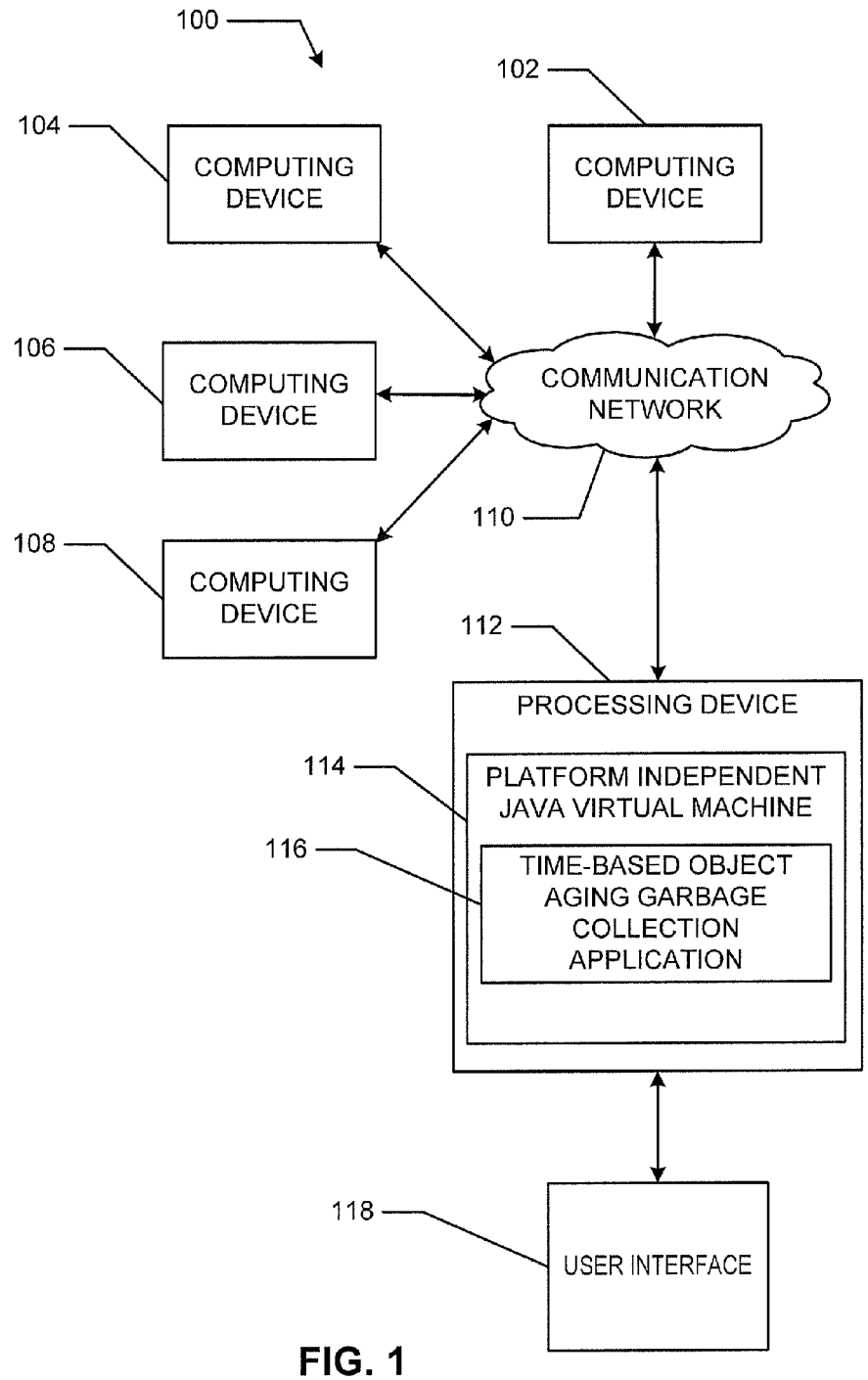
FIG. 1 is a block diagram illustrating an example computing environment for performing time-based object aging generational garbage collection, in accordance with an embodiment of the present disclosure.

FIG. 1 illustrates an example of a computing environment 100 for performing time-based object aging generational garbage collection in accordance with an embodiment of the present disclosure. The computing environment 100 includes computing devices 102, 104, 106, and 108, a communication network 110 and a processing device 112.

According to one aspect, computing devices 102, 104, 106, and 108 are a computer, a processing device, a communication device, or the like, such as a personal computer, a server computer, a tablet computer, a mobile processing device, a mobile communication device and/or the like. Each computing device includes one or more processors that process software or other machine-readable instructions and includes a memory to store the software or other machine-readable instructions and data. The memory may include volatile and/or non-volatile memory. Each computing device may also include a communication system to communicate via a wireline and/or wireless communications, such as through the Internet, an intranet, and Ethernet network, a wireline network, a wireless network, and/or another communication network. Each computing device may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

A system conforming to various aspects of the disclosure may involve any number and type of, and one or more of such computing devices that communicate with the processing device by way of the communication network 110. The communication network 110 can be the Internet, an intranet, a local area network, a wireless local network, or another communication network, as well as combinations of networks. In another aspect, the computing devices may be coupled or communicatively connected to the processing device 112 from a remote location, such as by a wide area network or the Internet. For example computing devices 102, 104, 106, and 108 may communicate with the processing device 112 through a private network to perform time-based generational garbage collection. Various levels of access to the computing environment 100 may be provided through a password and user ID system. In another aspect, the computing devices may communicate with the processing device 112 directly such as through an Ethernet connection.

According to one aspect, computing devices 102, 104, 106, and 108 are associated with Java Virtual Machine™ ("JVM") experts and/or JVM developers, capable of tuning a garbage collector. The term "tuning" generally refers to the modification of computer code in an attempt to improve the codes performance during execution. Thus, tuning a garbage collector refers to optimizing the garbage collection process performance. For example, a JVM developer may tune the garbage collector by altering the size of each generation defined in the heap, depending on how a given application allocates objects in the heap. As another example, the JVM developer may provide time data indicating when objects should be promoted from one generation to another. The JVM developer uses the keyboard (not shown) to enter time data into one of the computing devices 102, 104, 106, and 108. After entering the time data, the JVM developer uses the input device to input and transmit the time data to the processing device 112. While the present disclosure provides examples for applying time-based object aging to generational garbage collectors associated with JVMs, it is contemplated that time-based object aging generational garbage collection may be applied to any generational garbage collector or generation based garbage collection process and/or any computing device that uses a generational garbage collector and/or garbage collection process. Further, time based object aging may be applied to any type of virtual machine developed in any type of programming language that may employ a generation garbage collector or garbage collection process. For example, time based object aging may be applied to garbage collection processes associated with C and/or C++ runtime environments, virtual machines, etc. As another example, time-based object aging for generational garbage collectors may be implemented with the Dalvik™ virtual machine and processes.

According to another aspect, the time data may be received and/or retrieved from another processing device such as a computer, server, mobile device, and/or any other type of processing device capable of automatically tuning a garbage collector. In yet another aspect, the time data may be retrieved (e.g. downloaded) from a database and subsequently used to tune the garbage collector.

The processing device 112 may be a processing device, such as a computer, a communication device, a server computer, a tablet computer, a mobile processing device, a mobile communication device and/or the like. The processing device 112 includes one or more processors (not shown) that process software or other machine-readable instructions and includes a memory to store the software or other machine-readable instructions and data. The memory may include volatile and/or non-volatile memory. An operating system runs on the one or more processors and is used to control various components with in the processing device 112. The processing device 112 includes a platform independent java virtual machine ("PIJVM") 114. The platform independent Java virtual machine 114 provides a java runtime environment that executes a time-based object aging garbage collection application ("TBGA") 116 that performs garbage collection based on time data received from a user. For example, the TBGA 116 receives time data indicating when an object should be moved from one generation to the next oldest generation. The TBGA 116 promotes objects in one generation to another generation based on the time data received.

According to one aspect, a user-interface (UI) 118 may be operatively coupled to the processing device 112 such that an administrator, JVM developer, or other user may input time data to perform time-based object aging generational garbage collection. The UI 118 may include a display (not shown) such as a computer monitor, for viewing data and/or input forms, and an input device (not shown), such as a keyboard or a pointing device (e.g., a mouse, trackball, pen, or touch pad), for entering time data. For example, a JVM developer may use an input form to enter a time tenuring threshold as time data to perform garbage collection.

Figure 2:
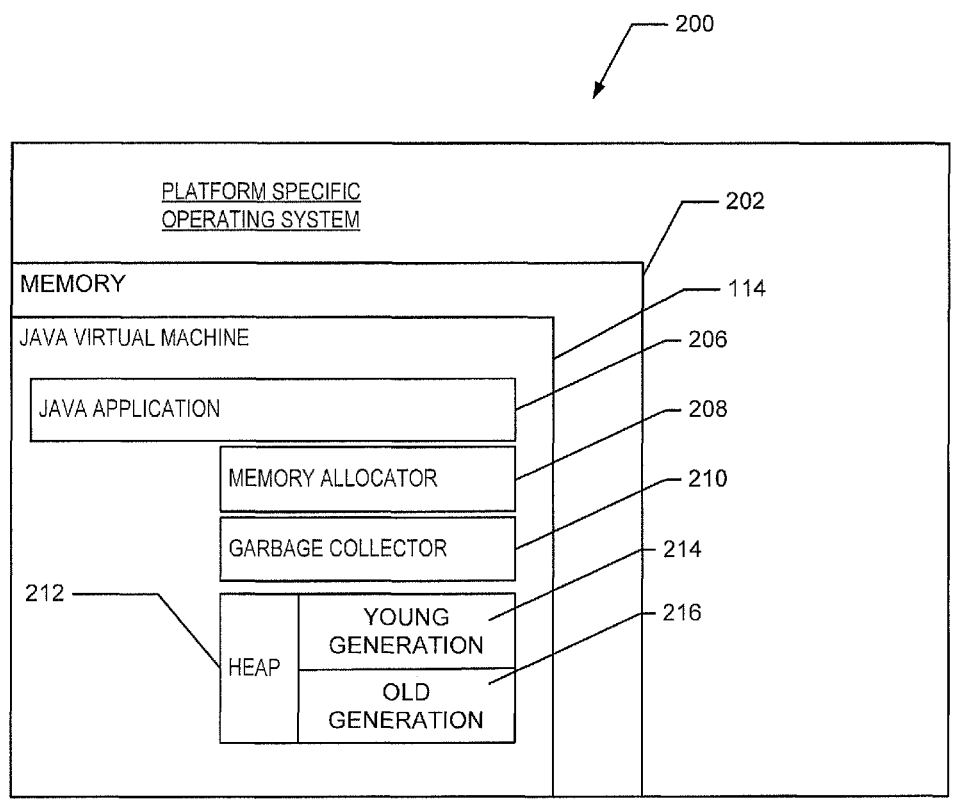
FIG. 2 is another block diagram illustrating an example computing environment for performing time-based object aging generational garbage collection, in accordance with an embodiment of the present disclosure.

FIG. 2 illustrates the relationship of hardware and/or software components operating within the processing device 112 that may implement aspects of the present invention. According to one aspect, the processing device 112 includes a platform specific operating system 200 that provides hardware and system support to software executing on a specific hardware platform. The processing device may include a memory 202 that stores the PIJVM 114. The PIJVM 114 is a virtual computer, with abstract specifications defining standard functions and features that may execute in conjunction with the platform specific operating system 200. The PIJVM 114 includes a java runtime environment with the ability to execute one or more java applications 206, such as TBGA 116, which is a software program, applet, etc., written in the java programming language.

The java application 206 comprises threads or processes that include and create program code and data. Typically the data created by a thread and/or process is called an "object." When an executing application thread or process creates an object, a memory allocation routine (not shown) allocates a region in the heap 212 for storing the object.

When the java application 206 creates an object, a memory allocator 208 in the JVM 14 is called, which allocates a region in the heap 212 to store the object. Such a process is known as dynamic memory allocation. The program code and related program data stored in the memory 202 uses a reference to point to the object in the heap 212.

The memory allocator 208 may be called repeatedly and allocate many regions in the heap to store objects created by the application 206. Since the heap space 212 is a limited in size, if the executing program continues to create objects and allocate heap space for new objects, eventually the heap space will be exhausted. Thus, blocks of memory space in the heap that are no longer being used by the executing program must be recovered using garbage collection.

In order to maintain the integrity of the heap, a garbage collector 210 recovers blocks of memory from the heap 212 that are no longer being used by the application 206. In particular, the garbage collector 210 removes objects from the heap 212 that the application 206 no longer references. Thus, the garbage collector 210 provides memory management services such as garbage collection and memory deallocation.

Garbage collection is a form of automatic memory management where unused memory in a heap is recovered. In particular, garbage collectors attempt to reclaim garbage, or memory occupied by objects that are no longer in use by an application or program. Generational garbage collection is a type of garbage collection based on the observation that most objects will die young because they become unreachable shortly after being allocated, and those objects that do not die young and have been reachable for sometime, will continue to be live and reachable.

Once objects have been allocated in the heap 212, the garbage collector 210 gathers and recovers unused memory by removing unused objects in the heap 212 upon the occurrence of a pre-defined event. For example, the garbage collector 210 may recover unused memory in the heap 212 when the available space in the heap 212 reaches a predefined threshold.

In order to perform generational garbage collection, the objects allocated in heap 212 are partitioned into sections or regions referred to as generations, based on the age of the object, where the object age is typically measured by the number of garbage collections the object has survived. For example, in order to perform generational garbage collection, the heap 212 may be divided into two generations, a young generation 214 and an old generation 216. Garbage collection is performed frequently on the young generation 214 heap space. Objects in the young generation 214 that are no longer reachable by the executing program are identified to be reclaimed by the garbage collection application, freeing up the memory used by the unreachable object. If an object in the young generation 214 has not been deallocated, or become unreachable (the object is still living) after a certain period of time, such as one or more garbage collection cycles, the object may be copied or promoted to the old generation 216. Garbage collection (using the same process as for the young generation) is performed on the old generation heap space less frequently, since it is assumed that most of the garbage is in the young generation 214. According to one aspect, the heap 212 may be divided into more than two generations, such as three generations, four generations, or N generations.

As noted above, typically all live objects are promoted from one generation to the next oldest generation each time a generational garbage collection is performed. However, the TBGA 116 promotes objects from one generation to the next oldest generation based on time data. Thus, generally speaking, object promotion may occur when the amount of time an object has survived in the heap is longer than the received time data, such as a time tenure threshold. Alternatively, object promotion may occur when an object reaches a particular age.

Figure 3:
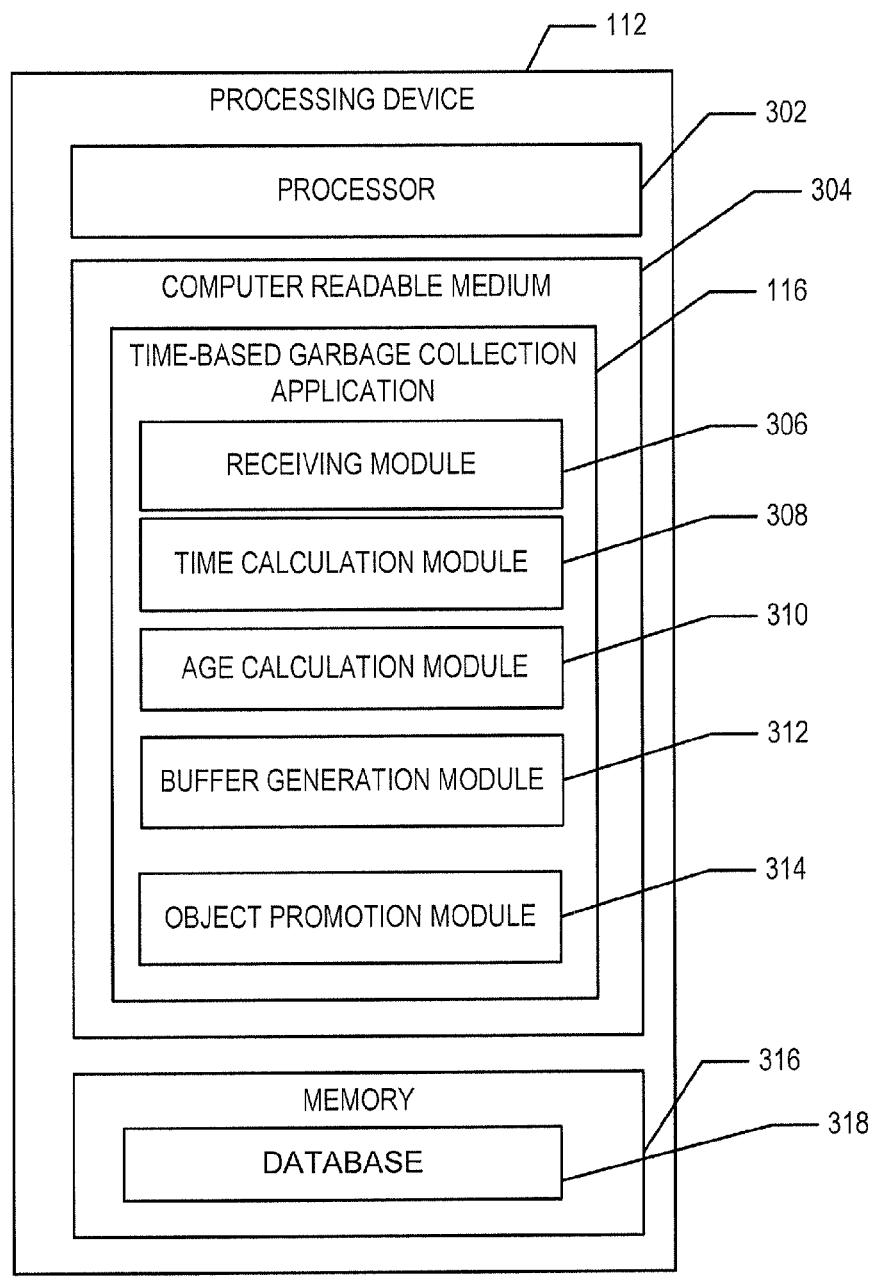
FIG. 3 is a block diagram illustrating the time-based object aging generational garbage collection application, in accordance with an embodiment of the present disclosure.

FIG. 3 is a block diagram that depicts an example processing device (i.e. processing device 112) that may be used to execute the TBGA 116. The processing device 112 includes a processor 302 that may be used in conjunction with the PIJVM 114 (see FIG. 1), to execute the TBGA 116 to perform time-based object aging generational garbage collection. The processor 302 may include memory as well as other computing components.

The processing device 112 may also include a memory 316 providing a database 318 to store time data. The memory 316 may include volatile and/or non-volatile memory. According to one aspect, database 318 is a general repository of data including but not limited to end time data, temporal data, and/or other data relating to some time-based metric informing the garbage collector how long an object should remain living. Besides memory, the database 318 may include memory and one or more processors or processing systems to receive, process, query and transmit communications and store and retrieve data. In another aspect, the database 318 may be a database server.

The processing device 112 may include a computer readable media ("CRM") 304 configured with the TBGA 116. The CRM 304 may include volatile media, nonvolatile media, removable media, non-removable media, and/or another available medium that can be accessed by the processing device 112. By way of example and not limitation, computer readable medium 304 comprises computer storage media and communication media. Computer storage media includes memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

According to one aspect of the disclosure, the TBGA 116 includes instructions or modules that are executable by the processor 302. Generally, program modules include routines, programs, objects, components, data structures, etc., that perform particular tasks or implement particular abstract data types. For example, in one embodiment, the TBGA 116 includes a receiving module 306, a time calculation module 308, an age calculation module 310, a buffer generation module 312, and an object promotion module 314 that may be used to perform time-based object aging generational garbage collection. It is contemplated that other modules may also be included.

The receiving module 306 receives time data from the computing devices 102, 104, 106, or 108. Time data is any type of time-based or temporal data associated that may quantify, qualify, indicate, and/or establish the amount or length of time an object should survive in one generation in the heap, before being promoted to the next oldest generation in the heap. According to one aspect, the time data may be a user-defined time tenuring threshold, which is a time-based value indicating when an object should be moved from one generation to the next. The time tenuring threshold may be represented in milliseconds, seconds, minutes, hours, days, etc., or any other type of units or measurements used to calculate and/or represent time. For example, the receiving module 306 may receive a time tenuring threshold of 24 seconds. Accordingly, any objects in one generation that have survived longer than the 24 second time tenuring threshold will be promoted to the next oldest generation.

According to another aspect, the receiving module 306 receives a time stamp indicating the starting time of a garbage collection. For example, the receiving module 306 may receive a time stamp of 20 seconds indicating that a garbage collection occurred 20 seconds from start. The time stamp may be represented in any unit or measurement of time. In yet another aspect, the time stamp may be represented in terms of processing cycles, relative time, actual time, etc.

The time calculation module 308 determines the elapsed time between a time stamp of when an object was created and a time stamp indicating when the latest garbage collection occurred. For example, three objects: A, B, and C are allocated in a heap. Each object is allocated with an initial time stamp value set to zero. The first garbage collection ("GC1") occurs at 5 seconds. The elapsed time between GC1 and the time stamps for objects A, B, and C, is 5 seconds. (5 seconds (GC1)–0 seconds (A,B,C)). After the first garbage collection, the time stamp for objects A, B, and C are updated to the time stamp of the first garbage collection the objects survived. Thus, the current time stamps for objects A, B, and C are updated to 5 seconds, the time stamp of GC1. Garbage collection 2 ("GC2") occurs at 19 seconds. Two new objects E and F are allocated with initial time stamps of zero. The elapsed time between GC2 and objects A, B, and C is 14 seconds. (19 seconds (GC2)–5 seconds (A,B,C)). The elapsed time between GC2 and objects E and F is 19 seconds. (19 seconds (GC1)–0 seconds (E,F)). After GC2, the time stamps for objects E and F are updated to the GC2 time stamp of 19 seconds. The time stamps of objects A, B, and C stay the same because GC2 was not the first garbage collection objects A, B, and C survived. (They survived GC1 before GC2).

According to one aspect, the time calculation module 308 retrieves an object age field value from an object and coverts the value into a unit of time. An object representation within a JVM may be enclosed within another data structure so the JVM can maintain additional object information. Such additional information may be maintained in a "mark word" or "object header". Within the "mark word" or "object header," (or more generally the Java object's meta-data) a given implementation of a JVM may include an object's age.

If an object's age is maintained in the "mark word" or "object header" there are advantages to minimizing the space (i.e. the number of bits) it uses/consumes. For example, the HotSpot™ JVM uses 4 bits to represent an object age, i.e. 4 bits can hold ages 0-15. In this instance, the object age is a count of the number of garbage collections the object survives. To minimize the space (i.e. the numbers of bits) used to hold an object's age, the time calculation module 308 converts the age into a value that represents a range of time. Subsequently, the time calculation module 308 encodes the time into a limited number of bits. For example, the calculation module 308 may encode the range of time into 4 bits. The 4 bits could hold a time ranging from, 0-15 seconds, 0-15 minutes, 0-15 hours, etc. As another example, if the age were converted to milliseconds, the time may be encoded into 64 bits. In yet another example, 10 bits could be encoded to represent a variety of different ranges of time, such as in milliseconds, seconds, minutes, etc. 1000 can be represented in 10 bits as there are 1000 milliseconds in a second. Additionally, 10 bits may cover 0-59 seconds. In one example, 6 bits may be used. 6 bits could cover a range from 0-63 which could map to 0-59 seconds, or 0-59 minutes.

The age calculation module 310 calculates the object age and/or the tenure age of an object for use in conjunction with time data, such as a time tenuring threshold, to determine whether an object should be promoted from one generation to the next oldest generation. According to one aspect, the object age calculation module 310 determines the "object age" of a given object based on the number of garbage collections the object has survived. For example, if an object survived 4 garbage collections, the object age would be equal to 4. If an object survived 1, 5, or 7 garbage collections, the object age would be 1, 5, or 7 respectively. According to another aspect, the object age calculation module 310 may determine the object age based on an object age increment flag. If the object age increment flag is set to true, the age of the object is incrementally increased. Alternatively, if the object age increment flag is false, the object age is not incrementally increased. For example, three objects: A, B, and C are allocated in a heap. Object A has an age of 1, object B an object age of 2, and C an object age of 3. The age calculation module 310 may analyze the object age increment flag and determine that the flag is set to true. Thus, the object age of objects A, B, and C will be incremented to 2, 3, and 4 respectively.

In yet another aspect, the age calculation module 310 may calculate a tenure age. A tenure age is an age based on the time data received from the receiving module 306, such as a time tenuring threshold, the elapsed time calculated by the time calculation module 308, and the values stored in the circular buffer generated by the buffer module 312, as will be described below. To calculate the tenure age, the age calculation module 308 identifies from the circular buffer, the youngest age slot where the elapsed time between the time stamp stored in the youngest age slot and the time stamp of the current garbage collection is equal to or greater than the time tenuring threshold received by the receiving module 306. Subsequently, the age calculation module sets the tenure age to youngest age slot+1. For example, a circular buffer with values [14, 7, 5, 0] has been generated by the buffer module 308. Thus, the buffer has 4 slots, indexed from 0-(N-1), or 0-3. (Slot 1 is indexed as 0, Slot 2 is indexed as 1, slot 3 is indexed at 2, and slot 4 is indexed as 3). Assume the receiving module 306 received a tenure threshold value of 12 seconds, and a time stamp of the current garbage collection at 19 seconds. The youngest age slot in the circular buffer is indexed at 1, holding the value 7, because the elapsed time between 19 seconds of the current garbage collection and the value 7 is 12, which is equal to or greater than the time tenuring threshold of 12 seconds. Thus, the tenure age is equal to 1 (youngest slot index of circular buffer)+1=2.

The age calculation module 310 may calculate a per-age time tenure threshold. A per-age time tenure threshold determines what age an object should be promoted from the one generation to the next oldest old generation, or more generally from a younger generational space to an older generational space. The age calculation module 310 uses an object's current age, a maximum tenuring threshold, and a target survivor space occupancy value to calculate the per-age time tenuring threshold. For example, the age calculation module 310 determines a "target survivor ratio", which is a percentage of a desired survivor space occupancy value that results after a garbage collection. The age calculation module 310 converts the target survivor ratio is into a number based on the size of a survivor space. According to one aspect, the target survivor ratio is a value that a JVM developer may set explicitly, or the age calculation module 310 may determine a default value.

The age calculation module 310 uses the target survivor ratio and the size of a survivor space and calculates a target survivor space size in bytes. Subsequently, during a garbage collection, the JVM evaluates how many bytes of survived objects there are and compares that to the target survivor space bytes. If the number of bytes that have survived is greater than the target survivor space bytes, the JVM, starting with the oldest objects begins promoting the oldest object until the amount of survived bytes is less than or equal to the target survivor space bytes. If all survived objects occupy less space than the target survivor space bytes, then only objects that have exceeded the maximum tenuring threshold are promoted. The maximum tenuring threshold is also a configurable attribute of a JVM that can be set explicitly by a JVM developer. If one is not specified, the JVM will choose a default value as the maximum tenuring threshold.

A buffer module 312 generates a circular buffer with N slots representing the last N garbage collections that may be used to determine a tenuring age calculated by the age calculation module 310, as will be described below. The buffer module 312 initializes all of the circular buffer slots to zero. The circular buffer is then used to store the time stamps indicating the starting times of each garbage collection received by the receiving module 306. For example, the buffer module 312 generates a circular buffer with 1 slot, and initializes the slot to zero. Subsequently, a garbage collection occurs at 5 seconds. The circular buffer stores the 5 second time stamp in the circular buffer. A second garbage collection occurs at 7 seconds. The second garbage collection time stamp of 7 seconds is stored in the circular buffer.

According to another aspect, the buffer module 312 may only store time stamps for garbage collections from which a tenure age may be determined. For example, the buffer module 312 generates a circular buffer with 1 slot, and initializes the slot to zero. Subsequently, a garbage collection occurs at 5 seconds. The circular buffer stores the 5 second time stamp in the circular buffer. A second garbage collection occurs at 7 seconds. It is determined that a tenure age cannot be calculated by the age calculation module from the second garbage collection. Thus, the time stamp of the second garbage collection is not added to the circular buffer. A third garbage collection occurs at 14 seconds. The third garbage collection time stamp of 14 seconds may be used to calculate the tenure age. Thus, the 14 second time stamp of the third garbage collection is added to the circular buffer.

The object promotion module 314 promotes objects from one generation to the next oldest generation. To promote objects, the object promotion module copies the object from the current generation the object is in to the next oldest generation. Subsequently, any memory space being used in the old generation by the object may be restored during garbage collection. According to one aspect, the object promotion module 314 may promote objects when the object has survived longer than the time tenure threshold. The object promoting module may compare a time tenuring threshold received from the receiving module 306 to the elapsed time between an object and the last garbage collection. When the elapsed time is greater than or equal to the time tenure threshold, the object promotion object promotes the object from the current generation to the next oldest generation. According to another aspect, the object promotion module 314 may promote objects when the object age is greater than a tenure age calculated by the age calculation module 310.

Figure 4:
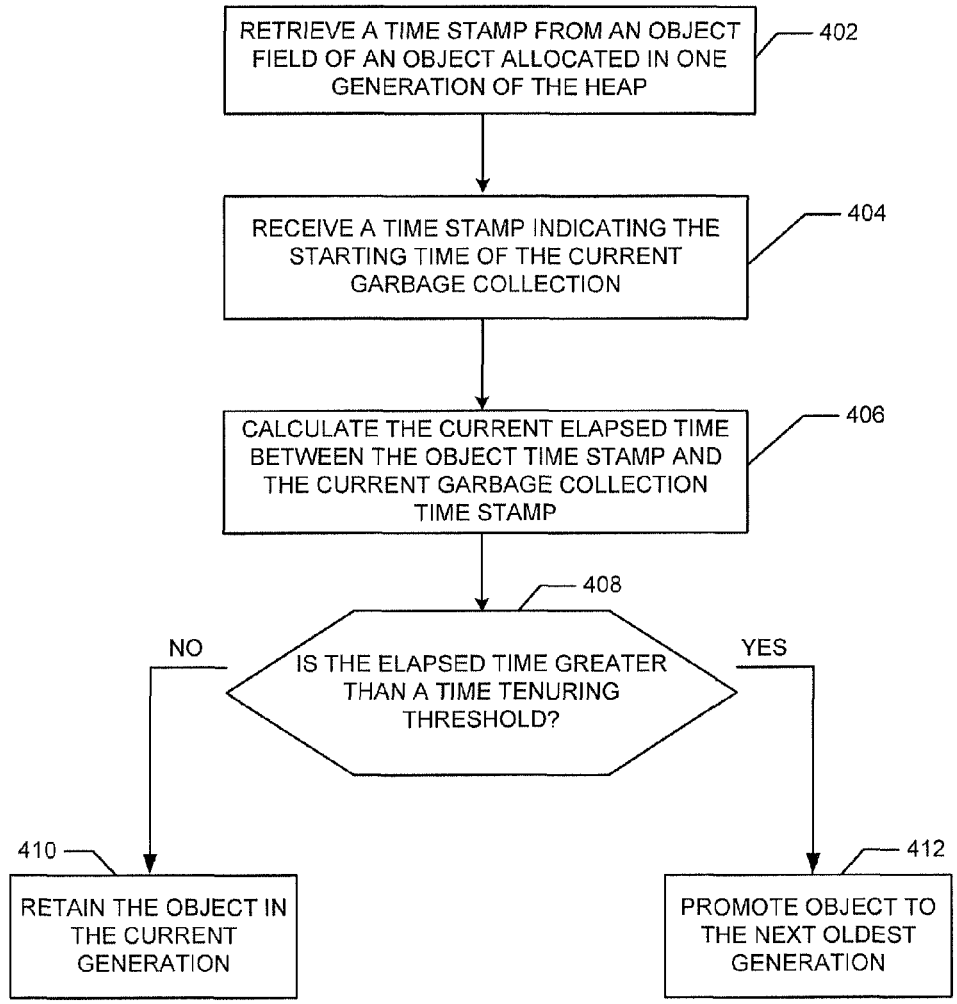
FIG. 4 is a method diagram illustrating an example method for performing time-based object aging generational garbage collection using elapsed time, in accordance with an embodiment of the present disclosure.

FIG. 4 illustrates an example method for promoting objects from one generation to the next oldest generation in order to perform garbage collection. At 402, a time stamp from an object field of an object allocated in one generation of the heap is received. A time stamp indicating the starting time of the current garbage collection is received at 404. At 406, the current elapsed time between the object time stamp and the current garbage collection time stamp is calculated. It is determined whether the elapsed time is greater that a time tenuring threshold at 408. At 410, when the elapsed time is not greater than the time tenuring threshold the object is retained in the current generation. When the elapsed time is greater than the time tenuring threshold the object is promoted to the next oldest generation at 412.

Figure 5:
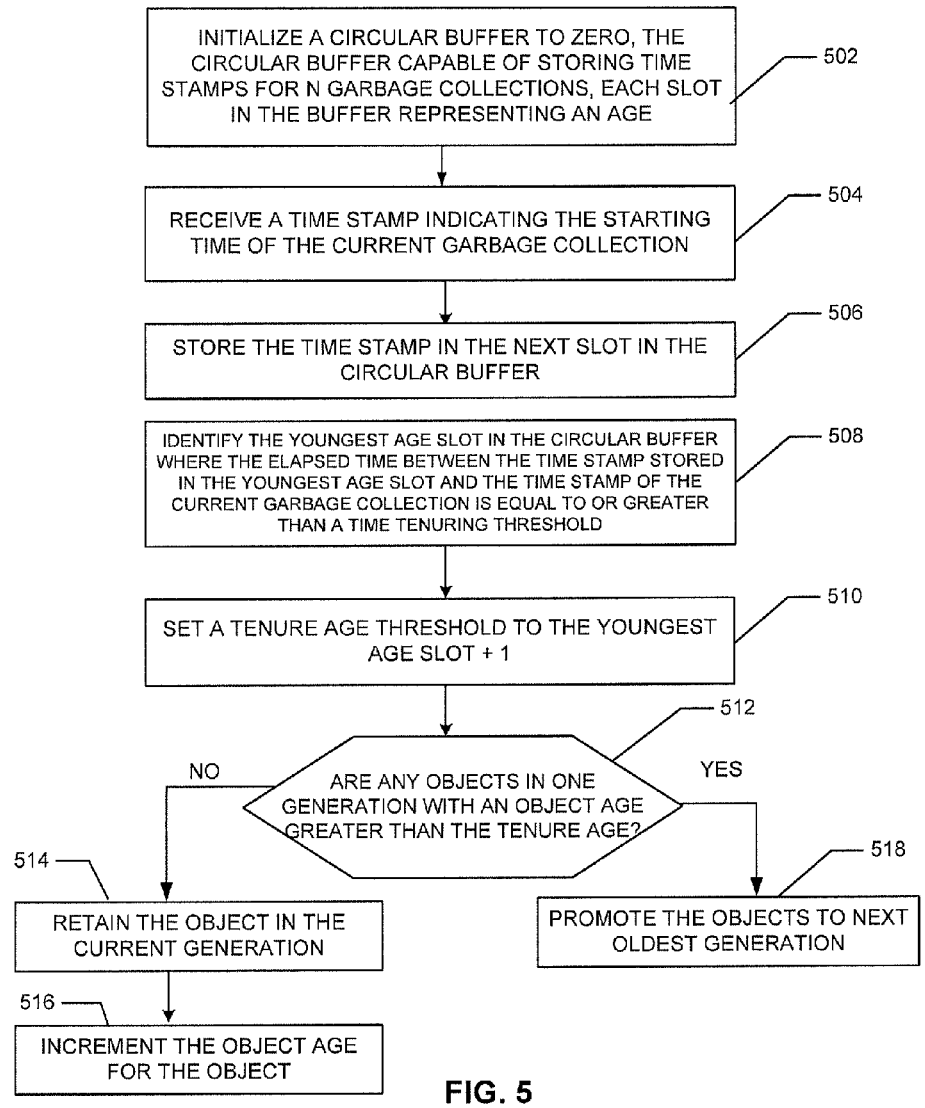
FIG. 5 is a method diagram illustrating an example method for performing time-based object aging generational garbage collection using a circular buffer, in accordance with an embodiment of the present disclosure.

FIG. 5 illustrates another example method for promoting objects from one generation to the next oldest generation in order to perform garbage collection. At 502, a circular buffer, capable of storing time stamps for N garbage collections where each slot in the buffer representing an age, is generated and initialized to zero. At 504 a time stamp indicating the starting time of the current garbage collection is received. The time stamp of the current garbage collection is stored in the next slot in the circular buffer at 506. At 508, the youngest age slot in the circular buffer where the elapsed time between the time stamp stored in the youngest age slot and the time stamp of the current garbage collection is equal to or greater than a time tenure threshold is identified. A tenure age threshold is set to the youngest age slot+1 at 510. At 512 it is determined whether there are any objects in one generation with an object age greater than the tenure age. When the object age is not greater than the tenure age, the object is retained in the current generation at 514. The object age is incremented at 516. When the object age is greater than the tenure age, the object is promoted to the next oldest generation at 518.

Figure 6:
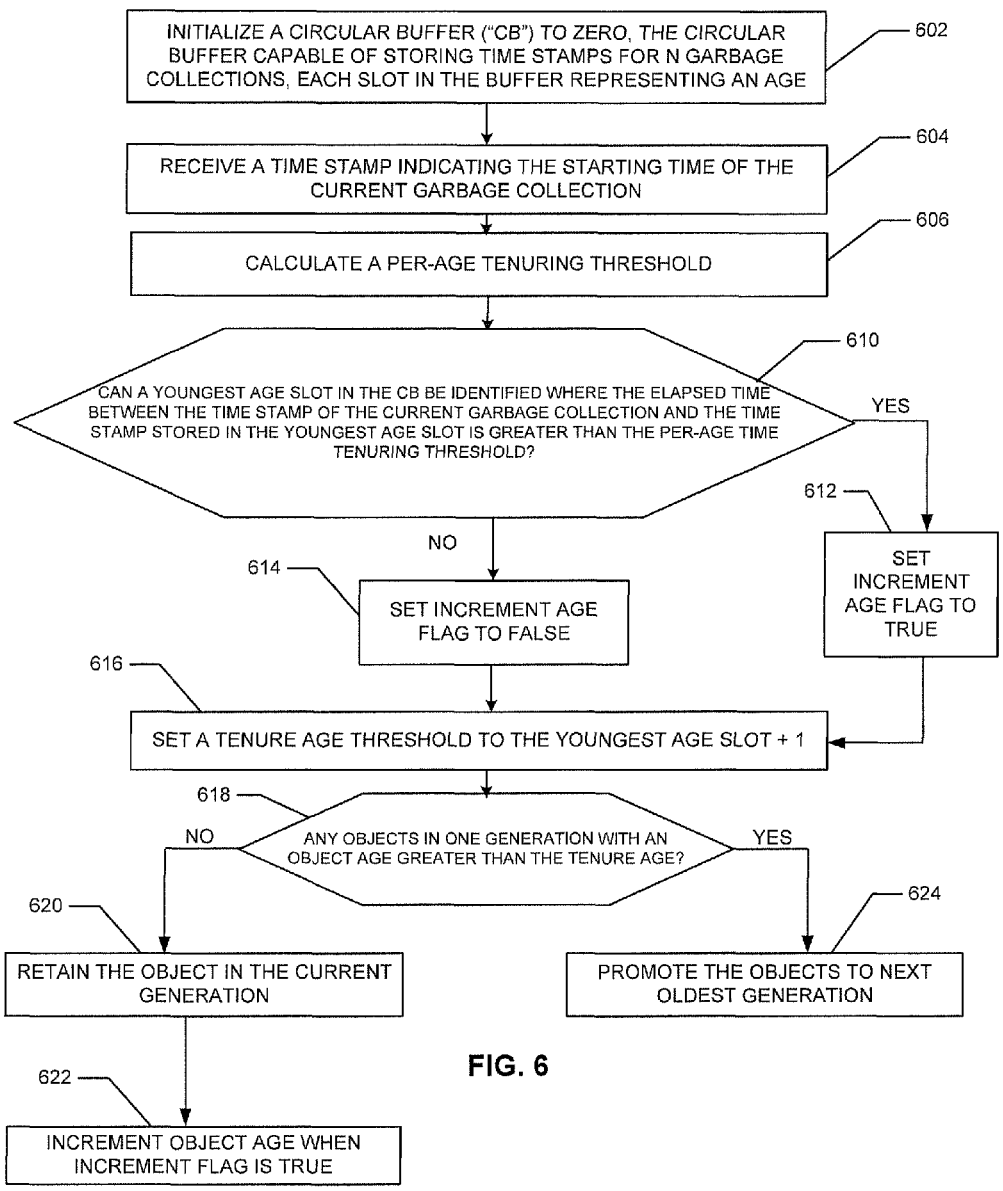
FIG. 6 is a method diagram illustrating an example method for performing time-based object aging generational garbage collection using a time increment age flag, in accordance with an embodiment of the present disclosure.

FIG. 6 illustrates yet another example method for promoting objects from one generation to the next oldest generation in order to perform garbage collection. At 602, a circular buffer, capable of storing time stamps for N garbage collections where each slot in the buffer representing an age, is generated and initialized to zero. At 604 a time stamp indicating the starting time of the current garbage collection is received. The time stamp of the current garbage collection is stored in the next slot in the circular buffer at 606. At 608, a per-age tenuring threshold is calculated. At 610 it is determined whether a youngest age slot in the circular buffer where the elapsed time between the time stamp of the current garbage collection and the time stamp stored in the youngest age slot is greater than the per-age time tenure threshold be identified. When the elapsed time is greater than the per-age time tenure threshold an increment age flag is set to true at 612. When the elapsed time is not greater than the per-age time tenure threshold an increment age flag is set to true at 614. At 616, a tenure age threshold is set to the youngest age slot+1. At 618 it is determined whether there are any objects in one generation with an object age greater than the tenure age. When the object age is not greater than the tenure age, the object is retained in the current generation at 620. The object age is incremented when the increment age flag is true at 622. When the object age is greater than the tenure age, the object is promoted to the next oldest generation at 624.

Figure 7:
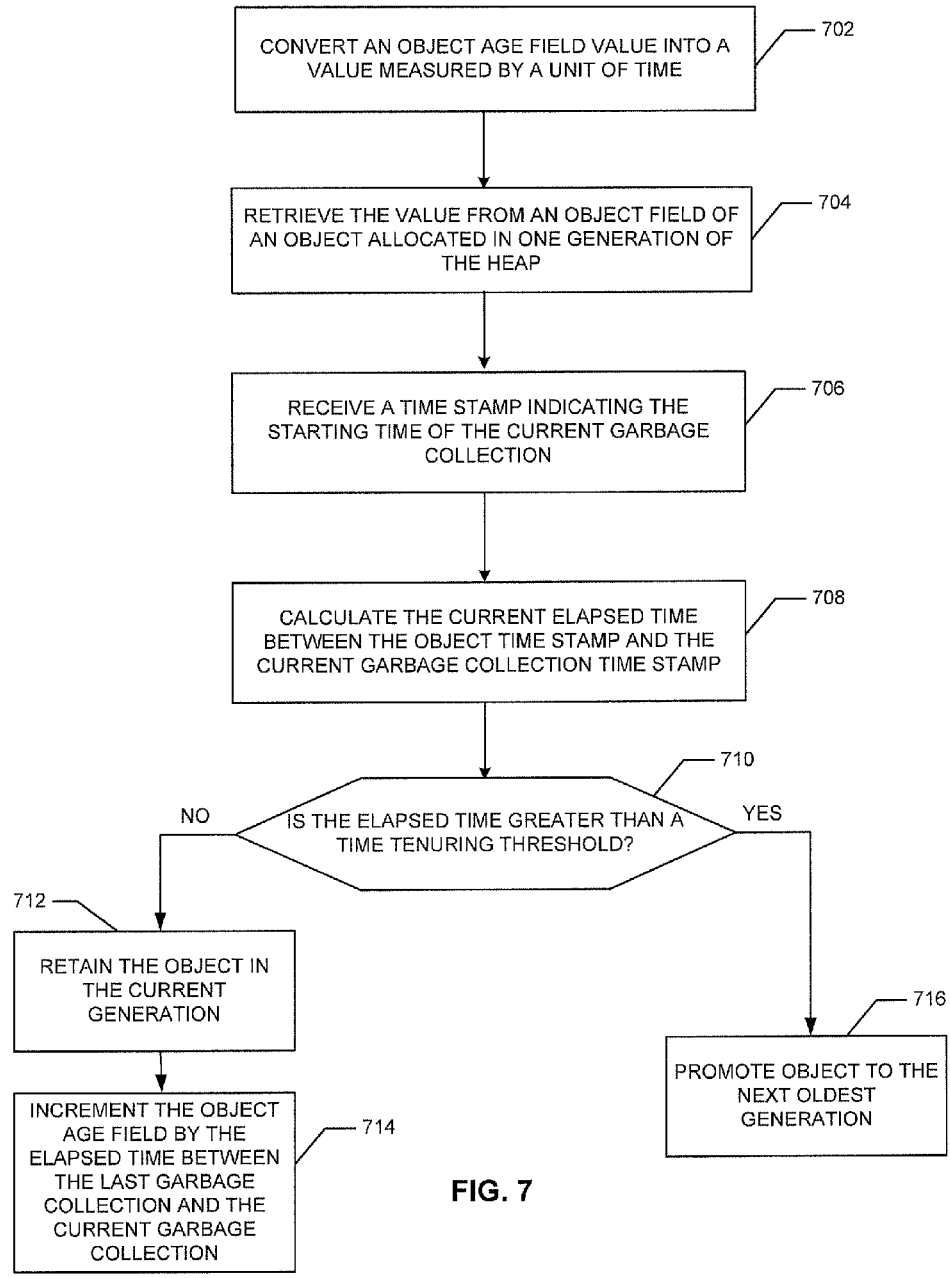
FIG. 7 is a method diagram illustrating an example method for performing time-based object aging generational garbage collection using an object age field, in accordance with an embodiment of the present disclosure.

FIG. 7 illustrates an example method for promoting objects from one generation to the next oldest generation in order to perform garbage collection. At 702, an object age field is converted into a value measured by a unit of time. An object field of an object allocated in one generation of the heap is received at 704. At 706, a time stamp indicating the starting time of the current garbage collection is received. The current elapsed time between the object time stamp and the current garbage collection time stamp is calculated at 708. It is determined whether the elapsed time is greater that a time tenuring threshold at 710. At 712, when the elapsed time is not greater than the time tenuring threshold the object is retained in the current generation. The object age field is incremented by the elapsed time between the last garbage collection and the current garbage collection at 714. When the elapsed time is greater than the time tenuring threshold the object is promoted to the next oldest generation at 716.

Thus, embodiments, in accordance with the invention, allow JVM developers to provide time data indicating when objects should be moved from one generation to another older generation. In particular, embodiments, in accordance with the present disclosure, allows for a JVM configuration that defines how long an object should be retained in one generation in terms of a unit of time (i.e. milliseconds, seconds, minutes, etc) before that object should be moved to another older generation. The use of time data is beneficial since many users of JVMs know the average time, or a worst case time, that a given transaction in a software application will take to execute, and thus, know when data or objects will no longer be alive or in use by the application. Such information may be used to efficiently remove unused objects from the heap, freeing up memory for reuse. Further, using time data is a natural means for developers to configure a JVM for a software application based on elapsed (average or worst case) transaction time data.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for time-based object aging garbage collection comprising:
   receiving, using at least one processor, a time tenuring threshold specifying an amount of time a plurality of objects survive in a memory;
   receiving, using the at least one processor, first time data indicating an occurrence of a first garbage collection;
   receiving, using the at least one processor, second time data for each object of the plurality of objects, the second time data comprising a time stamp specifying when a particular object of the plurality of objects was allocated in the memory;

calculating, using the at least one processor, an elapsed time value for each object of the plurality of objects by determining a first elapsed time between the first time data and the corresponding time stamp;

promoting, within the memory, at least one object of the plurality of objects when the elapsed time value meets the time tenuring threshold; and when the elapsed time value fails to meet the time tenuring threshold:
retaining the at least one object at a current location within the memory; and
incrementing an object age field based on a second elapsed time between the first time data and a second garbage collection, the object age field corresponding to the at least one object.

2. The method of claim 1, wherein the first time data includes a start time of the first garbage collection.

3. The method of claim 1, wherein the memory includes a heap arranged with at least a first generation and a second generation, and wherein promoting the at least one object of the plurality of objects comprises copying the at least one object from the first generation to the second generation when the elapsed time value meets the time tenuring threshold.

4. The method of claim 3, wherein the elapsed time value meets the time tenuring threshold when the elapsed time value is at least equal to the time tenuring threshold.

5. The method of claim 1, wherein the time tenuring threshold is defined in milliseconds.

6. The method of claim 1 further comprising receiving, at the at least one processor, second time data from each object of the plurality of objects.

7. A system for time-based object aging generational garbage collection comprising:
at least one processor;
a memory in operable communication with the at least one processor; and
a time based object aging generational garbage collection application comprising modules executable by the processor, the modules comprising:
a receiving module to:
receive a time tenuring threshold specifying a time a plurality of objects survive in a heap in a memory;
receive first time data indicating the occurrence of a first garbage collection;
receive second time data for each object of the plurality of objects, the second time data comprising a time stamp specifying when a particular object of the plurality of objects was allocated in the memory;
a calculation module to calculate an elapsed time value for each object of the plurality of objects by determining a first elapsed time between the first time data and the corresponding time stamp; and
a promotion module to:
promote at least one object of the plurality of objects when the elapsed time value meets the time tenuring threshold and
when the elapsed time value fails to meet the time tenuring threshold:
retain the at least one object at a current location within the memory; and increment an object age field based on a second elapsed time between the first time data and a second garbage collection, the object age field corresponding to the at least one object.

8. The system of claim 7, wherein the first time data is a time stamp specifying a start time of the first garbage collection.

9. The system of claim 7, wherein the memory includes a heap arranged with at least a first generation and a second generation, and wherein the promotion module is further configured to promote the at least one object of the plurality of objects by copying the at least one object from the first generation to the second generation when the elapsed time value meets the time tenuring threshold.

10. The system of claim 7, wherein the elapsed time value meets the time tenuring threshold when the elapsed time value is at least equal to the time tenuring threshold.

11. The system of claim 7, wherein the receiving module is further configured to receive second time data from each object of the plurality of objects.

12. A non-transitory computer-readable medium encoded with time-based object aging generational garbage collection application comprising modules executable by a processor, the modules comprising:
a receiving module to:
receive a time tenuring threshold specifying the amount of time a plurality of objects survive in a heap in a memory;
receive first time data indicating the occurrence of a garbage collection; and
receive second time data for each object of the plurality of objects, the second time data comprising a time stamp specifying when a particular object of the plurality of objects was allocated in the memory;
a calculation module to:
calculate an elapsed time value for each object of the plurality of objects by determining a first elapsed time between the first time data and the corresponding time stamp; and
a promotion module to:
promote at least one object of the plurality of objects when the elapsed time value meets the time tenuring threshold and
when the elapsed time value fails to meet the time tenuring threshold:
retain the at least one object at a current location within the memory; and
increment an object age field based on a second elapsed time between the first time data and a second garbage collection, the object age field corresponding to the at least one object.

13. The non-transitory computer-readable medium of claim 12, wherein the time data is a time stamp specifying a start time of the first garbage collection.

14. The non-transitory computer-readable medium of claim 12, wherein the memory includes a heap arranged with at least a first generation and a second generation, and wherein the promotion module is further configured to promote the at least one object of the plurality of objects by copying the at least one object from the first generation to the second generation when the elapsed time value meets the time tenuring threshold.

15. The non-transitory computer-readable medium of claim 12, wherein the elapsed time value meets the time tenuring threshold when the elapsed time value is at least equal to the time tenuring threshold.

* * * * *

UNITED STATES PATENT AND TRADEMARK OFFICE
CERTIFICATE OF CORRECTION

PATENT NO. : 8,825,721 B2  
APPLICATION NO. : 13/251974  
DATED : September 2, 2014  
INVENTOR(S) : Hunt et al.

Page 1 of 1

It is certified that error appears in the above-identified patent and that said Letters Patent is hereby corrected as shown below:

On the Title Page

On page 2, column 2, item (56), under Other Publications, line 2, delete "SIGLAN" and insert -- SIGPLAN --, therefor.

In the Specification

In column 10, line 48, delete "that" and insert -- than --, therefor.

In column 11, line 42, delete "that" and insert -- than --, therefor.

Signed and Sealed this
Twenty-fourth Day of March, 2015

Michelle K. Lee
*Director of the United States Patent and Trademark Office*